United States Patent [19]

Modolo

[11] Patent Number: 4,602,704
[45] Date of Patent: Jul. 29, 1986

[54] FASTENING DEVICE FOR A BICYCLE BRAKE BLOCK

[75] Inventor: Domenico Modolo, Conegliano, Italy

[73] Assignee: Modolo Adamo & C. S.N.C., Sarano S. Lucia Di Piave, Italy

[21] Appl. No.: 595,541

[22] Filed: Mar. 27, 1984

[51] Int. Cl.$^4$ .................. F16D 65/04; F16D 69/04
[52] U.S. Cl. .................. 188/73.1; 188/246;
 188/250 B; 188/250 G; 269/235; 269/238;
 403/374
[58] Field of Search .............. 188/24.22, 73.1, 250 B,
 188/250 G, 234, 246; 269/235, 236, 238, 909;
 403/374

[56] References Cited

U.S. PATENT DOCUMENTS

| | | | |
|---|---|---|---|
| 150,677 | 5/1874 | Deering | 188/246 |
| 558,282 | 4/1896 | Keeling | 188/246 |
| 1,464,308 | 8/1923 | Copony et al. | 403/374 X |
| 1,571,243 | 2/1926 | Down | 188/234 X |
| 2,581,040 | 1/1952 | Mullenbach | 269/235 X |
| 3,484,095 | 12/1969 | Park | 269/235 |

FOREIGN PATENT DOCUMENTS

| | | | |
|---|---|---|---|
| 0010693 | 5/1980 | European Pat. Off. | |
| 0071762 | 2/1983 | European Pat. Off. | |
| 0075761 | 4/1983 | European Pat. Off. | |
| Ad.60039 | 3/1907 | France | 188/234 |
| 23991 | 1/1922 | France | 188/73.1 |
| 412373 | 6/1934 | United Kingdom | 188/24.22 |
| 443867 | 3/1936 | United Kingdom | |
| 1075815 | 7/1967 | United Kingdom | |
| 1182428 | 2/1970 | United Kingdom | |
| 1234375 | 6/1971 | United Kingdom | |
| 1256692 | 12/1971 | United Kingdom | |
| 1378509 | 12/1974 | United Kingdom | |
| 775430 | 11/1980 | U.S.S.R. | 403/374 |

*Primary Examiner*—George E. A. Halvosa
*Attorney, Agent, or Firm*—Young & Thompson

[57] ABSTRACT

Brake block fastening device for bicycle, made up of a body and a resilient element, which combined together form a cavity capable of receiving and retaining the brake block, the resilient element being kept close to the body by a shifting cam device, capable of selectively locking or unlocking the block.

1 Claim, 4 Drawing Figures

FASTENING DEVICE FOR A BICYCLE BRAKE BLOCK

The present invention relates to a fastening device for brake blocks to be normally used on bicycles.

The replacement of a brake block on a bicycle, particularly during a race, is usually a difficult and time consuming operation.

The object of this invention is to provide a block fastening device that enables a quick replacement of the block, particularly for racing bicycles.

Another object is to provide a universal block holder that could fit the various sizes of blocks made at present time by various manufacturers.

The main object has been achieved by providing a fastening device which is made up of a body and a resilient element, which forms together with the body a cavity that receives and keeps in place the brake block, which in turn is held close to the body by a shifting cam mechanism capable of selectively locking or unlocking the brake block according to need.

Preferably the resilient element fits into a slot provided in the body.

The cam mechanism is effective on the resilient element by means of a bolt. In this case it is recommended to use an eyebolt having a hole 33 at one end so that part of the cam device can fit and rotate into it. The threaded bolt end, on which a nut will be screwed, will hold the resilient element in place; the same nut will perform the function of adjusting in the desired position the particular brake block to be used. In this manner, the cavity can accommodate any size of brake blocks.

The cam device acts whithin the body preferably by means of an insert cut out from hardened steel sheet.

The present invention will now be explained, taking as an example an embodiment which has been shown in the enclosed drawings, in which.

Figure 1:
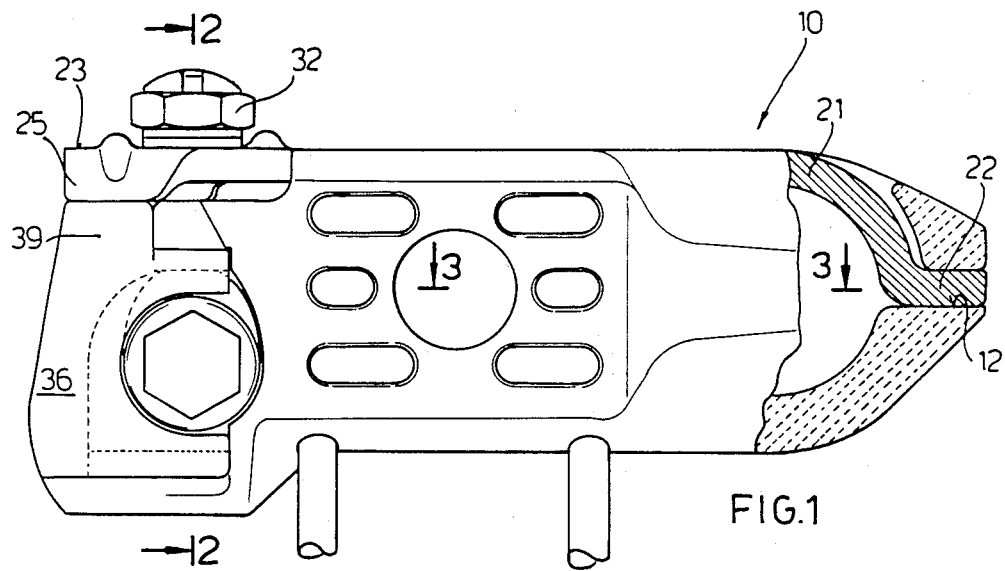
FIG. 1 shows a partially sectioned side view of the proposed fastening device.

It will be seen from the drawings how the brake block F is kept in place by a fastening device generally indicated by 10. This device comprises a body 11 which holds the brake block F on two sides as well as at the back, particularly with its jaw 13 that faces another jaw 26 made up of a resilient element 21. Brake block F will therefore be held in place by jaws 13 and 26. One end 22 of resilient element 21 fits into a slot 12, provided in body 11. The resilient element 21 is made so as its other end 23 tends to move away from jaw 13. This is kept in place near body 11 by a threaded bolt 31 that fits into hole 24 of resilient element 21, and then is locked by means of nut 32.

Near end 23 of resilient element 21, a projection 25 is meant to fit over end 39 of insert 36, as will be shown further on.

Bolt 31 bears a hole at one end, to receive cylindric part 38 of cam device 34, which bears a hexagonal cavity 35, so that it can be rotated by a spanner.

Figure 3:
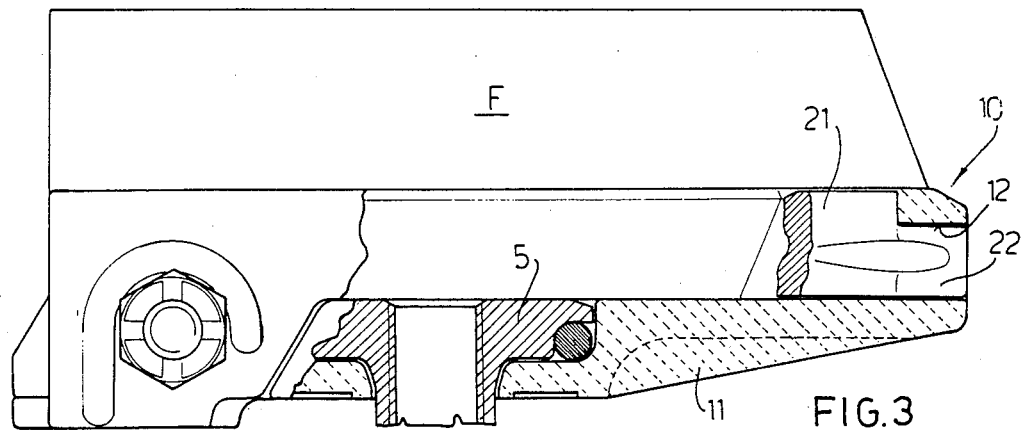
FIG. 3 shows a view taken along line 3—3 of FIG. 1.
Figure 4:
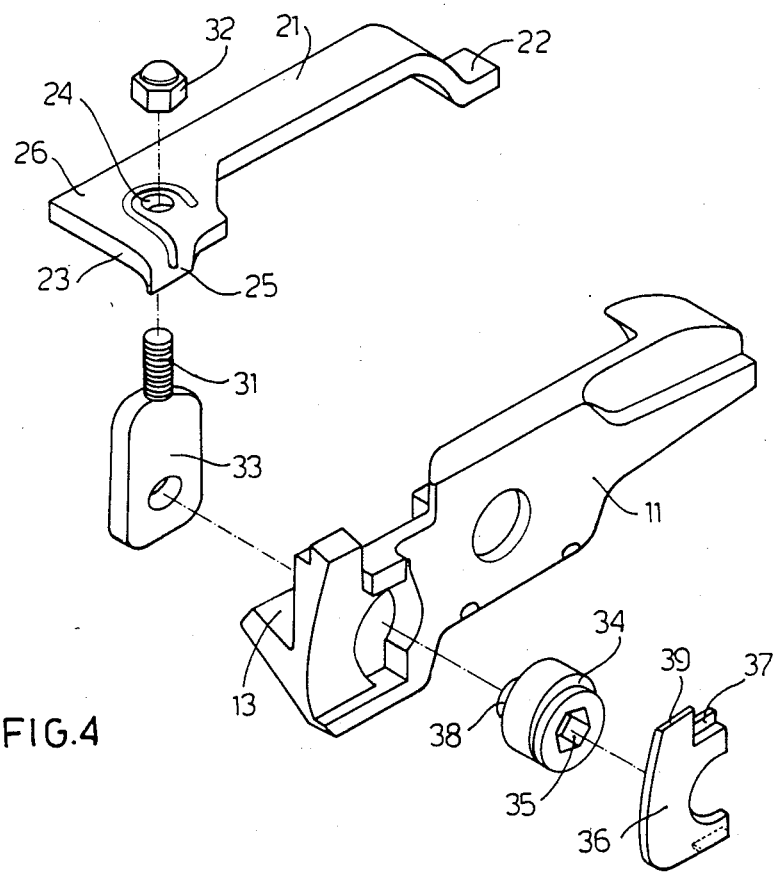
FIG. 4 shows an exploded view of the device.

Body 11 is equipped at the back, i.e. on the opposite side to which brake block F will fit, with a well known clamping mechanism which enables its fastening to the bicycle. This is represented with 5 in FIG. 3.

Figure 2:
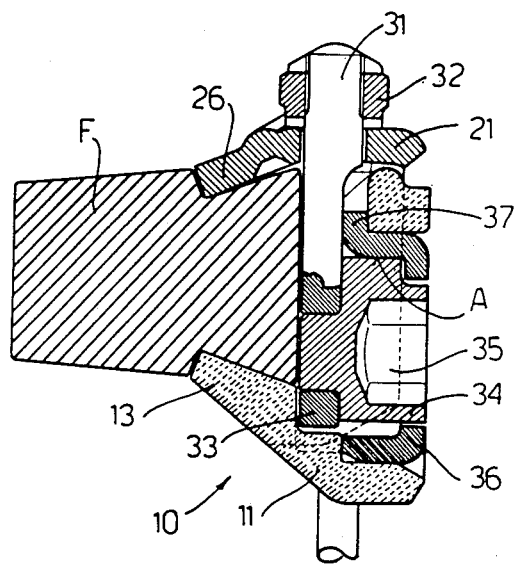
FIG. 2 shows a section taken along line 2—2 of FIG. 1.

Preferably an insert 36 of hardened steel is placed between cam device 34 and body 11 in order to keep cam device 34 in place; cam device 34 is connected to body 11 by tooth 37 (FIG. 2).

Cam device 34, when locked, contacts area A of insert 36 (FIG. 2). End 39 of this insert is retained by projection 25, thus all parts are kept in place as shown in FIG. 2. By rotating at 90° cam device 34, bolt 31 together with nut 32 lifts up under the pressure of resilient element 21, thus increasing the distance between jaws 13 and 26 and releasing brake block F.

In order to assemble the device, one should begin by inserting end 22 of resilient element into slot 12, then fit bolt 31 into hole 24 of resilient element, and screw nut 32 on bolt 31. Insert 36 will be placed on cam device 34 and the whole will be inserted into body 11, arranging cylindrical part 38 of cam device 34 into hole 33.

What I claim is:

1. Brake block fastening device for a bicycle, comprising a first jaw, a resilient second jaw, one end of each of said first and second jaws being joined to define a cavity capable of receiving and retaining the brake block, cam means for selectively locking and unlocking said device in a closed and opened position, respectively, the resilient second jaw being stressed away from said first jaw in the closed position, such that when the device is unlocked by said cam means, the stressed second jaw relaxes and the device assumes its open position, said cam means being disposed in said first jaw and acting inside the said cavity defined by the jaws upon movement in one direction to draw the jaws together, by means of a separate insert of hardened steel so designed as to secure said cam means within said first jaw, and, in turn, be secured to said device by at least one of said jaws.

* * * * *